United States Patent
Hu et al.

(10) Patent No.: US 11,533,290 B2
(45) Date of Patent: Dec. 20, 2022

(54) SYSTEMS AND METHODS FOR PROVIDING MULTI-TENANT DYNAMIC HOST CONFIGURATION PROTOCOL SERVICES

(71) Applicant: Nicira, Inc., Palo Alto, CA (US)

(72) Inventors: Michael Hu, San Jose, CA (US); Ansis Atteka, Sunnyvale, CA (US); Dongping Chen, Beijing (CN); Bo Lin, Beijing (CN); Yi Zeng, Beijing (CN); Shadab Shah, Fremont, CA (US)

(73) Assignee: NICIRA, INC., Palo Alto, CA (US)

( * ) Notice: Subject to any disclaimer, the term of this patent is extended or adjusted under 35 U.S.C. 154(b) by 944 days.

(21) Appl. No.: 15/718,583

(22) Filed: Sep. 28, 2017

(65) Prior Publication Data

US 2019/0097966 A1 Mar. 28, 2019

(51) Int. Cl.
| | |
|---|---|
| *H04L 61/5014* | (2022.01) |
| *H04L 61/5053* | (2022.01) |
| *H04L 61/5061* | (2022.01) |
| *H04L 49/00* | (2022.01) |
| *H04L 67/30* | (2022.01) |

(52) U.S. Cl.
CPC ...... *H04L 61/5014* (2022.05); *H04L 61/5053* (2022.05); *H04L 61/5061* (2022.05); *H04L 49/70* (2013.01); *H04L 67/30* (2013.01)

(58) Field of Classification Search
CPC .............................................. G06F 2009/45595
See application file for complete search history.

(56) References Cited

U.S. PATENT DOCUMENTS

| | | | |
|---|---|---|---|
| 9,356,906 B2 | 5/2016 | Thakkar et al. | |
| 9,548,965 B2 | 1/2017 | Wang et al. | |
| 2004/0088405 A1* | 5/2004 | Aggarwal | H04L 41/069 709/224 |
| 2007/0198664 A1* | 8/2007 | Satkunanathan | H04L 41/0806 709/220 |
| 2007/0234346 A1* | 10/2007 | Kramer | G06F 8/61 717/174 |
| 2014/0282889 A1* | 9/2014 | Ishaya | H04L 63/08 726/4 |
| 2015/0058968 A1* | 2/2015 | Wang | H04L 63/0281 726/12 |

(Continued)

OTHER PUBLICATIONS

"A Scalable Multi-Datacenter Layer-2 Network Architecture", Chen et al., whole document. (Year: 2015).*

*Primary Examiner* — Tonia L Dollinger
*Assistant Examiner* — Jonathan A Sparks
(74) *Attorney, Agent, or Firm* — Adeli LLP (57) ABSTRACT

Systems and methods described herein provide a high availability DHCP server capable of serving multiple tenants in a data center. The DHCP server may use a different logical DHCP server instance for each tenant, and may be implemented as one process without the use of namespaces. A DHCP server is executed on a gateway virtual machine (VM) that is capable of hosting a plurality of logical DHCP servers. For each tenant in a data center, a logical network and a corresponding logical DHCP server instance are implemented. The DHCP server may service requests for DHCP services from VMs via their physical host by determining the tenant that the VM originates from and leasing a DHCP resource from that tenant's corresponding logical DHCP server instance.

24 Claims, 7 Drawing Sheets

(56) References Cited

U.S. PATENT DOCUMENTS

| | | | | |
|---|---|---|---|---|
| 2015/0334696 A1* | 11/2015 | Gu | ................... | H04L 67/1095 718/1 |
| 2016/0210209 A1* | 7/2016 | Verkaik | ............... | G06F 11/2033 |

* cited by examiner

SYSTEMS AND METHODS FOR PROVIDING MULTI-TENANT DYNAMIC HOST CONFIGURATION PROTOCOL SERVICES

BACKGROUND

In the modern "internet of things world," a host or a virtual machine (VM) in a network relies on its respective internet protocol (IP) address to communicate with other hosts or virtual machines throughout the network. The IP address provides not only an identity for any VM that is accessing the internet, but also a means for different types of services to recognize the VM. Dynamic Host Configuration Protocol (DHCP) is a service that enables clients to automatically obtain network configuration parameters, such as an IP address, subnet mask, default gateway, and DNS configuration, from a DHCP server. Thus, in a data center for example, DHCP services may dynamically manage and distribute IP addresses to various tenants within the data center.

In some situations, such as that described with reference to FIG. 43 in U.S. Pat. No. 9,356,906 ("the '906 patent") incorporated by reference herein, a central DHCP daemon and several local DHCP daemons are utilized. The central DHCP daemon provides DHCP services to VMs of different tenants through local DHCP daemons. Each local DHCP daemon maintains and manages a batch of addresses to offload the central DHCP daemon's service to the local DHCP daemons. Thus, a range of IP addresses could be assigned for different tenants in the data center using network address translation (NAT). However, such assignment requires a separate DHCP server instance for each tenant in the data center. Therefore, a data center with 10,000 tenants would require 10,000 DHCP servers, with each DHCP server running on a separate VM or namespace. Such implementations can be costly, requiring large amounts of CPU, memory, and network processing resources. The '906 patent describes, in general terms, multiplexing a DHCP server for multiple users, but does not explain how such a multi-user (also referred to as "multi-tenant") server maintains isolation across multiple users while permitting a distinct restricted configuration access for each of the multiple users, wherein each user can manage the common DHCP service configurations for only the VMs they control. In addition, it is difficult to provide redundant support for non-stop DHCP services with such a large number of DHCP servers running concurrently. Most DHCP service solutions also do not provide for protection from media access control (MAC)/IP spoofing.

SUMMARY OF THE INVENTION

The embodiments described herein provide a high availability DHCP server capable of serving multiple tenants in a data center, for example. The DHCP server may use a different logical DHCP server instance for each tenant or logical network, and may utilize a single process without the use of namespaces for receiving and responding to requests for DHCP services. For example, the embodiments described herein provide a method for providing dynamic host configuration protocol (DHCP) services to one or more software defined logical overlay networks by using a single DHCP process. A plurality of gateway virtual machines (VMs) are defined, wherein each of the gateway VMs is configured to execute a separate DHCP server that may run in a single DHCP process, thereby creating a plurality of DHCP servers to provide a highly available DHCP service for the multiple overlay networks. For each of the logical networks, a respective logical DHCP server instance is defined within each of the first and second DHCP servers, wherein each of the logical DHCP server instances includes one or more static bindings or internet protocol (IP) addresses for assignment to one or more VMs of each logical network. A logical forwarding element (LFE) configured to route one or more packets between the logical network and the first DHCP server is defined and a LFE port associated with the logical DHCP server instance is defined, wherein the LFE port is configured to connect the LFE to the first DHCP server. The first DHCP server identifies a logical network that a packet originates from based on a LFE port identification (ID) of the packet. Lease information pertaining to IP addresses that are dynamically leased by the first DHCP server is periodically synchronized between the first DHCP server and at least one other DHCP server from the plurality of DHCP servers.

DETAILED DESCRIPTION

The present disclosure relates to providing a high availability DHCP server capable of serving multiple tenants using a single process. In a data center for example, the DHCP server may host a different logical DHCP server instance for each tenant, and may be implemented with a single process without the use of namespaces.

Figure 1A:
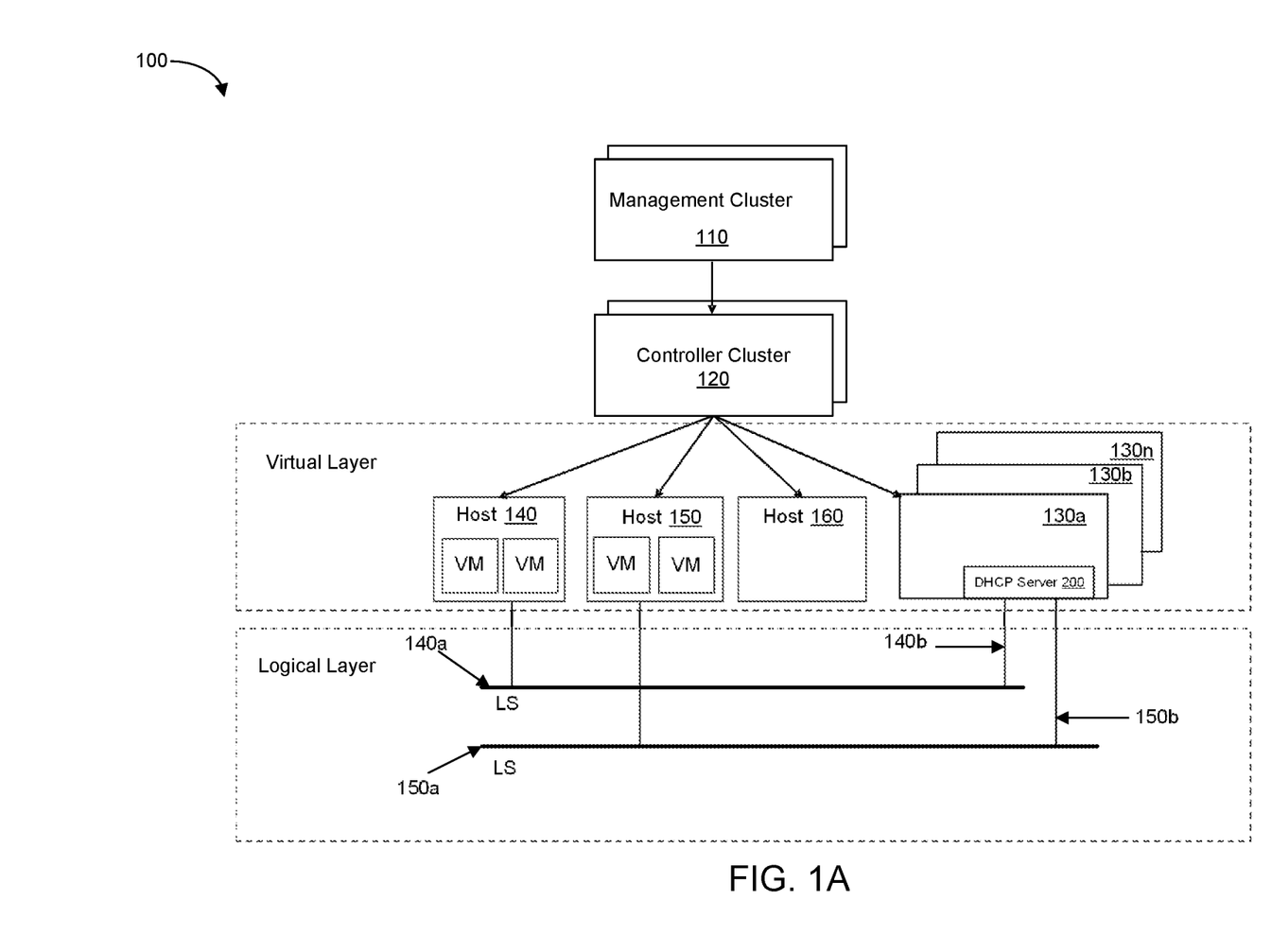
FIG. 1A is a block diagram of an exemplary network architecture for providing DHCP services in accordance with some embodiments of the present disclosure.

FIG. 1A illustrates a network architecture 100 in accordance with some embodiments of the present disclosure. Network architecture 100 includes a management cluster 110, a controller cluster 120, and one or more host devices 140, 150, and 160, each configured to run hypervisors on which various virtual machines may run. Management cluster 110 may enable logical overlay networks to be programmatically created, provisioned and managed, utilizing the underlying physical network as a simple packet forwarding backplane. Each logical overlay network is implemented by populating forwarding tables in virtual switches at each host having VMs connected to that logical overlay network so that a logical overlay network may be collectively implemented by a plurality of virtual switches. Each virtual switch is a software implementation of a physical Layer 2 (from the OSI model) switch. The overlay network is decoupled from the underlying physical network by packet encapsulation techniques (e.g., VXLAN, STT, Geneve, etc.) using tunnel endpoints (not shown) associated with the virtual switches at each host. Management cluster 110 also enables the programmatic creation and management of logical switches, logical routers, and firewall rules by leveraging the virtual switches already present in hypervisors running on host devices 140-160, for example. A logical switch is an abstraction of a physical switch and can be conceptualized as a collection of VMs (or other endpoints such as namespace containers such as Docker® containers) that can communicate with one another in the logical overlay space. One example of a management cluster 110 is VMware NSX® Manager™. Management cluster 110 may also provide an interface through which a user/admin may specify the parameters of their logical network.

Controller cluster 120 may include an advanced distributed state management system that provides control plane functions for logical switching and routing functions. Control cluster 120 may act as the central control point for all logical switches within a network and maintains information about all hosts, logical switches, and distributed logical routers. A logical network defined by management cluster 110 is communicated to control cluster 120, which, in conjunction with other components not shown, translates the logical network into forwarding table entries in virtual machines on hosts which include VMs connected to the defined logical network. For example, control cluster 120 may maintain a table of the MAC address of each VM registered to a logical switch. In some embodiments, the controller cluster 120 may perform some or all of the functions of the management cluster 110 as well as its own functions.

FIG. 1A also illustrates host devices 140, 150, and 160, each of which may execute one or more VMs. Each VM on each host may execute on a hypervisor (not shown) that is running on the host. All the VMs running on a host may belong to one logical network or to different tenants and/or different logical networks.

Management cluster 110 may initialize a plurality of gateway VMs 130a-130n in the data plane, wherein each gateway VM may provide the underlying system that a physical DHCP server may run on and host one or more logical DHCP server instances. Gateway VMs may also reside on one or more hosts (not shown), such as hosts 140, 150, 160. A gateway VM may be any suitable VM capable of facilitating physical DHCP services as described herein, such as an edge node, for example. In some embodiments, the edge node may be a VMware NSX® Edge™, which is discussed more fully in U.S. Pat. App. Pub. 2015/0106804, U.S. Pat. App. Pub. 2013/0044636, and NSX-transformer DHCP Service Functional Specification, all of which are hereby incorporated by reference. In an alternate embodiment (not shown), DHCP servers may be deployed using container technology, such as that available from Docker®, either within VMs 130a, 130b, etc., or on an operating system installed directly on a bare metal server. For example, DHCP services may be realized on a VMware NSX® Edge™ deployed as a bare metal server.

Management cluster 110 may select gateway VMs 130a and 130b to act as a DHCP server pair. More specifically, management cluster 110 may create a DHCP profile object (not shown) having configuration parameters indicating gateway VMs 130a and 130b as the location where logical DHCP services will be realized. Thus, a logical DHCP server instance created with this DHCP profile may service DHCP requests from VMs on logical switches that are connected to the gateway VMs 130a and 130b (as specified in the profile object). The DHCP profile object may include other configuration parameters for defining a logical DHCP server instance such as the unique universal identifier (UUID) of the gateway VMs 130a and 130b, as well as static bindings and/or IP pools the logical DHCP server instance is to be provisioned with, lease duration, warning threshold, error threshold, and classless static route option, among others. Management cluster 110 may assign a UUID to the DHCP profile object in order to easily reference it when creating future logical DHCP server instances, for example. Management cluster 110 may designate gateway VM 130a as an active VM, and designate gateway VM 130b as an inactive (standby) VM with which to carry out failover processes (as discussed in more detail below) in case of a failure of gateway VM 130a. The DHCP profile object may be reused by the management cluster 110 to create multiple logical DHCP server instances. The management cluster 110 may add the UUID of the DHCP profile object into its own configuration profile, in order to streamline the creation of future logical DHCP server instances.

Each of the plurality of gateway VMs 130a-130n may be configured to execute a respective DHCP server, such as DHCP server 200 executing on gateway VM 130a, resulting in a plurality of DHCP servers. As described in more detail herein, a DHCP server executing on a gateway VM may host one or more logical DHCP server instances using a single DHCP server process.

When a VM of a host, such as host 140, requires DHCP services, management cluster 110 may provision a logical switch, such as logical switch 140a configured to facilitate requests for DHCP services from VMs of the host 140, for example. Logical DHCP server instances may have a 1:1 relationship with logical switches. Alternatively, management cluster 110 may utilize an already existing logical switch, such as logical switch 150a, for example to facilitate requests for DHCP services from VMs of host 140. Thus, in some embodiments, if VMs from multiple hosts are required to get IP addresses from the same logical DHCP server instance, then they can be connected to the same logical switch. Logical switch 140a may be implemented across several managed switching elements (not shown). Logical switch 140a may route network traffic between various VMs running on host 140. Stated differently, logical switch 140a may make switching decisions to route network data at the data link layer between the one or more VMs running on host 140 based on one or more forwarding tables (not shown) that the logical switch 140a has. It should be noted that the use of a logical switch, such as switch 140a, is by example only, and any appropriate logical forwarding element (LFE) may be used. For each logical switch, management cluster 110 may provision a logical DHCP server instance (not shown) within the DHCP servers 200 and 300 (both shown in FIG. 4) executing on gateway VMs 130a and 130b respectively. Management cluster 110 may reference the UUID of the previously created DHCP profile object to establish the configuration parameters of the logical DHCP server instance. For example, if hosts 140 and 150 both require DHCP services, then management cluster 110 may reference the DHCP profile object to provision different logical DHCP server instances for each, and replicate each logical DHCP server instance to DHCP servers 200 and 300. In some embodiments, management cluster 110 may provision a single logical switch (e.g., logical switch 140a) and assign both hosts 140 and 150 to it. As discussed above, the DHCP profile object may specify gateway VMs 130a and 130*b* as the location where logical DHCP services will be realized, as well as the static bindings and/or IP pools, lease duration, warning threshold, error threshold, classless static route option, and other configuration options for logical DHCP servers. Management cluster 110 may create a logical switch port on each logical switch, that may act as an interface between that logical switch and its corresponding logical DHCP server instance in the DHCP server 200. For example, management cluster 110 may create logical switch port 140*b* on the logical switch 140*a*, which may act as an interface between logical switch 140*a* and its corresponding logical DHCP server instance within DHCP server 200. Because the logical switch 140*a* is to be connected to a logical DHCP server instance, management cluster 110 may configure the logical switch port 140*b* as a DHCP type port, and assign the logical DHCP server instance UUID to the logical switch port 140*b*, thereby associating the logical switch 140*a* to its corresponding logical DHCP server instance. As described in further detail below with respect to FIG. 2, when a VM of the host 140 requests DHCP services, the DHCP server 200 may lease a static binding or dynamically lease an IP address from the logical DHCP server instance associated with the logical switch that the host 140 is connected to. Each request packet received by DHCP server 200 may carry the logical switch port ID of the logical switch the packet originated from (in the present example, the logical switch port ID of logical switch port 140*b*). Thus, the DHCP server 200 may determine the host a packet originates from (as well as the corresponding logical DHCP server instance) based on the logical switch port ID carried by the packet.

Figure 1B:
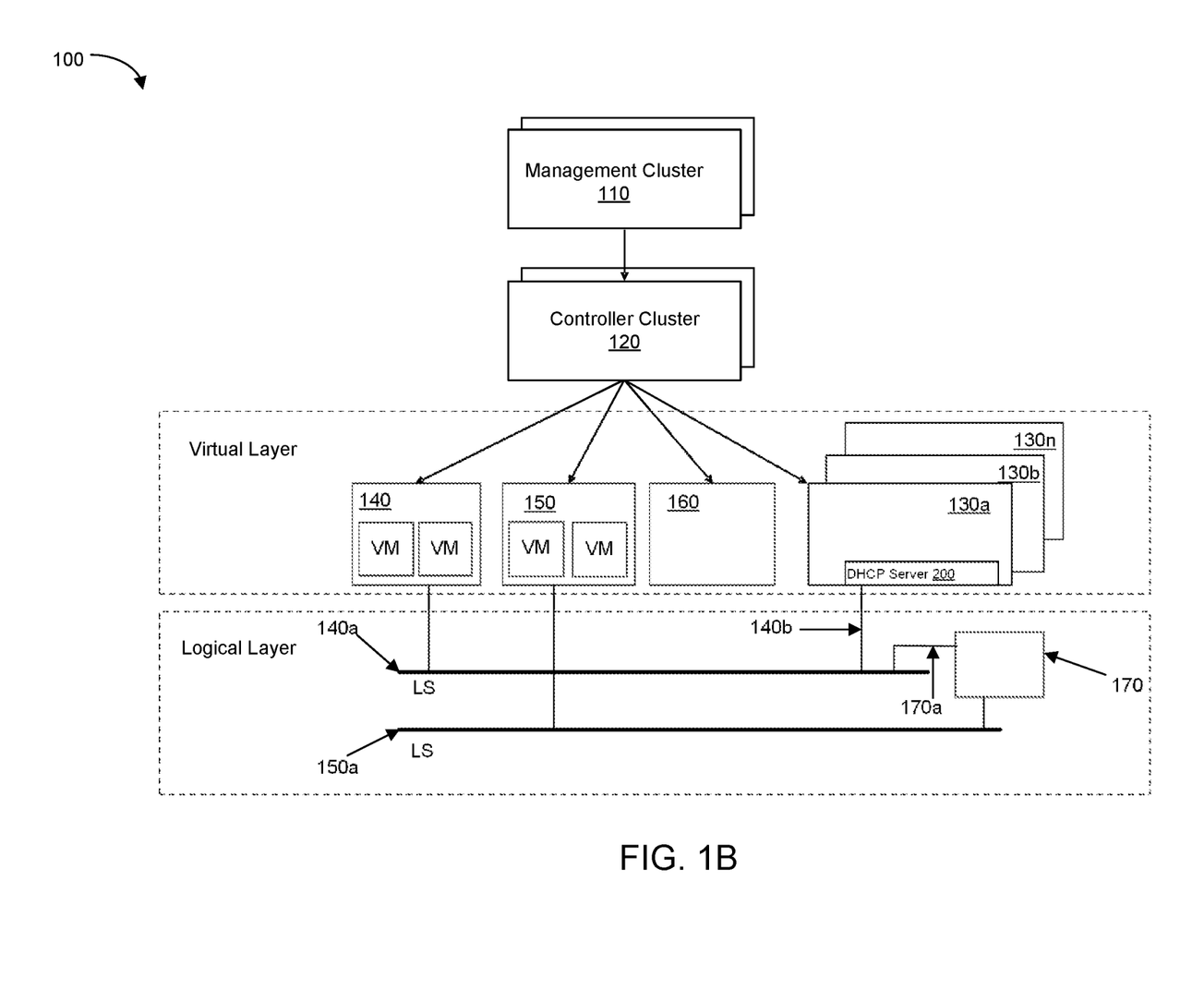
FIG. 1B is a block diagram of an exemplary network architecture for providing DHCP services in accordance with some embodiments of the present disclosure.

In some embodiments, a logical DHCP server instance may serve more than one logical switches through the use of a logical relay. For example, FIG. 1B illustrates network architecture 100 with a DHCP relay configuration. Management cluster 110 may define a DHCP relay profile indicating the UUID of a logical DHCP server instance that will act as the target logical DHCP server instance. In the example of FIG. 1B, the logical DHCP server instance associated with logical switch 140*a* is the target logical DHCP server instance. Management cluster 110 may then create a logical router 170 on logical switch 150*a* to proxy DHCP requests from VMs of host 150 routed via logical switch 150*a* to the logical DHCP server instance associated with logical switch 140*a*. More specifically, management cluster 110 may define a downlink port 170*a* to proxy DHCP requests from VMs on logical switch 150*a* to the logical DHCP server instance associated with logical switch 140*a*.

Figure 2:
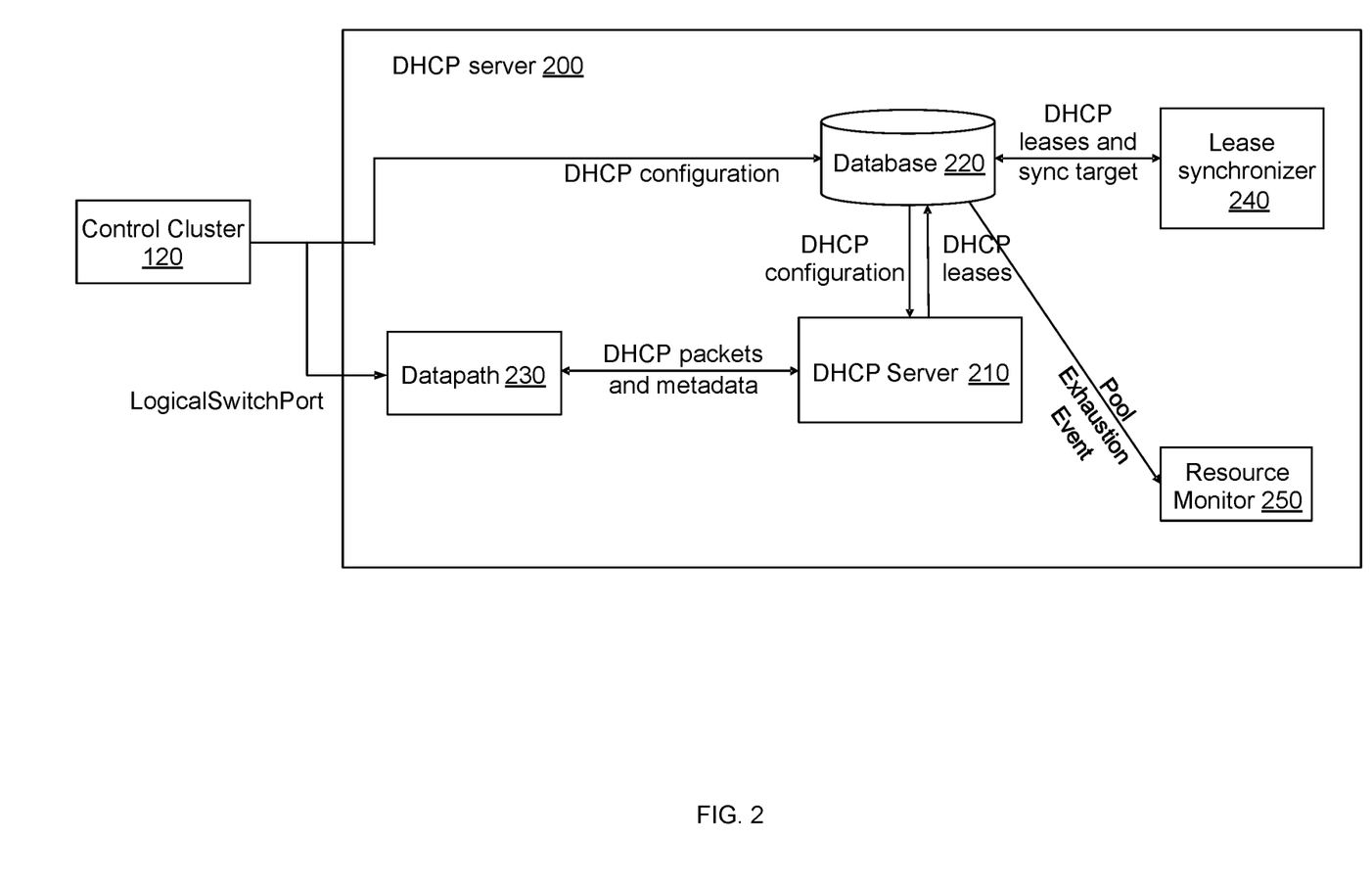
FIG. 2 is a block diagram of an exemplary DHCP server in accordance with some embodiments of the present disclosure.

FIG. 2 illustrates a block diagram of DHCP server 200. Each component of DHCP server 200 shown in FIG. 2 may represent a physical process running in the data plane. Control cluster 120 may act as the central control point for all logical switches within a network while maintaining information about all hosts, logical switches, and distributed logical routers. The DHCP server 200 may include a DHCP server process 210, a database 220, a datapath 230, a lease synchronizer 240, and a resource monitor 250. DHCP server process 210 may be a process running in the root namespace, and may start when the gateway VM is booted up.

As discussed above, the management cluster 110 (shown in FIG. 1) of the network may define one or more logical DHCP server instances and their associated logical switch ports as well as the configuration parameters that each logical DHCP server instance is to be provisioned with. The management cluster 110 may transmit this information to the control cluster 120, which may write the configuration parameters for each logical DHCP server instance as well as the mappings between each logical DHCP server instance and its associated logical switch port directly to an associated configuration table within the database 220 of the DHCP server 200. DHCP server process 210 may monitor the configuration tables and copy the information contained in them, as well as any changes to the tables into its own internal data structure. Each configuration table may include a lease entry indicating lease information for that logical DHCP server instance. Lease information may include information such as the static bindings and/or dynamic IP address assignments that the logical DHCP server instance has leased out. Thus, logical DHCP server 200 may host multiple logical DHCP server instances, as they are created for each host.

As discussed further below, each configuration table may also entries containing information about the configuration parameters and the logical switch port ID of its associated logical DHCP server instance. In addition, each configuration table may also contain a separate resource entry, which contains the status of the logical DHCP server instance's resources (e.g., threshold, error as discussed above with respect to FIG. 2). Further, each configuration table may contain one or more entries indicating whether the associated logical DHCP server instance is active mode or in standby mode as well as whether it is ready or not ready to provide DHCP services.

Upon receiving a request for DHCP services, DHCP server process 210 may lease either a static binding or a dynamic IP address from the IP pool to the requesting VM, and then write the lease assignment to the appropriate configuration table in database 220.

More specifically, datapath 230 may include a data plane development kit (DPDK)-based framework which bypasses the kernel networking stack for packet fast forwarding/receiving. Datapath 230 may receive a DHCP request packet from a VM via the control cluster 120. Such DHCP request packets may include the logical switch port ID of the logical switch port that connects the logical switch that routed the requesting VM's request packet. Datapath 230 may forward received DHCP request packets and their logical switch port ID to DHCP server process 210, which may identify the logical DHCP server instance associated with the logical switch port ID and service the request accordingly. This is related to the 1:1 relationship between logical switches and DHCP servers. In another embodiment, the logical server instance is associated with a logical network identifier (often referred to as a "VNI") instead of a particular switch port. VNIs uniquely identify a particular logical switch which (possibly among others) may be assigned to a particular tenant and/or logical DHCP instance.

DHCP server process 210 may query database 220 for the lease information of the logical DHCP server instance associated with the logical switch port ID of the DHCP request packet and determine an appropriate static binding or dynamic IP address to lease to the requesting VM. DHCP server process 210 may generate a packet including the lease offer and send the packet with the appropriate logical switch port ID to the datapath 230 for routing to the appropriate logical switch port, which may route the assignment back to the requesting VM. DHCP server process 210 may update the lease entry in the configuration table associated with the logical DHCP server instance with the assignment. In some embodiments, if a relay is used, DHCP server process 210 may write the IP address leased, as well as the logical switch port ID, the subnet, and the media access control (MAC) address of the VM the lease was provided to in the lease entry of the corresponding logical DHCP server instance's configuration table within database 220. In some embodiments, if a relay is not used, the DHCP server process 210 may write the IP address leased, as well as the logical switch port ID and the subnet of the VM the lease was provided to, as well as an all zero MAC address in the lease entry of the corresponding logical DHCP server instance's configuration table within database 220. In some embodiments, DHCP server process 210 may attempt to maintain IP address leases for as long as possible to a requesting VM by associating the IP address with the requesting VM's MAC address. After expiration of the lease, DHCP server process 210 may refrain from leasing that IP address out to VMs having a different MAC address than the one associated to the IP address until, for example, there are no other remaining IP addresses to lease out. If the VM with the associated MAC address subsequently requests DHCP services, DHCP server process 210 may look up the IP address associated with the VM's MAC address and assign the IP address to the requesting VM if it is still available.

In some embodiments, a VM in need of DHCP services may send a request for such services as a broadcast packet to each logical switch. In other embodiments, if a DHCP server is providing DHCP services to multiple VMs via a logical router (as discussed in more detail below with respect to FIG. 1B), a VM in need of DHCP services may send a request for such services via the logical router, which may send the request as a unicast packet to each logical switch. In these embodiments, a DHCP server may identify the host a packet originates from based on its logical router ID.

The resource monitor 250 may monitor the lease entry of the configuration table for each logical DHCP server instance and issue a warning indicator when the resources (e.g., static binding and/or IP pools) of a particular logical DHCP server instance reach a predefined usage threshold. For instance, upon determining that a particular logical DHCP server instance has only three IP addresses left for leasing, resource monitor 250 may transmit a threshold indicator to the database 220, thereby setting a "threshold reached" status in a resource entry of the configuration table for that logical DHCP server instance in database 220. In addition, upon determining that a particular logical DHCP server instance has no IP addresses left for leasing, resource monitor 250 may transmit an error indicator to the database 220, thereby setting an "error" status in a resource entry of the configuration table for that logical DHCP server instance in database 220. If DHCP server 200 detects an error indicator in the resource entry of a logical DHCP server instance, then it will no longer serve requests for services from the logical DHCP server instance until the error indicator is removed.

Referring to FIGS. 1A and 2, DHCP server 200 may persist the lease information locally as well as synchronize lease information corresponding to dynamic IP address leases ("IP address lease information") with a DHCP server executing on another gateway VM, such as DHCP server 300 executing on gateway VM 130*b*, for example. As described in more detail below with respect to FIG. 3, lease sync 240 may synchronize IP address lease information for each logical DHCP server instance being hosted by the DHCP server 200, to one or more other DHCP servers executing on other gateway VMs (such as gateway VM 130*b*). Because each logical DHCP server instance hosted by DHCP server 200 may have different standby hosts and/or different active and standby periods, the IP address lease information for each may be synchronized to DHCP servers on different gateway VMs. In addition, lease sync 240 may receive IP address lease information from DHCP servers executing on other gateway VMs from the plurality of gateway VMs 130*a*-130*n*. The IP address lease information received may correspond to the dynamic IP address leases of one or more logical DHCP server instances being hosted on one or more gateway VMs 130*a*-130*n*. Lease sync 240 may write the IP address lease information received from other DHCP servers into respective configuration tables in database 220 meant for backing up the lease information from other DHCP servers.

As discussed above, the host devices 140-160 may execute various virtual machines, such as software forwarding elements that may collectively implement different LFEs (e.g., logical switches, logical routers, etc.) for different logical networks of different tenants, users, departments, etc. that use the same shared computing and networking resources. FIGS. 1A and 1B illustrate the distinction between the virtual layer including the various virtual appliances (e.g. virtual switches) running on hosts 140-160, and the logical layer, including logical switches, logical routers, and logical DHCP server instances. The logical layer may be implemented by leveraging the virtual appliances already present in hosts 140-160. Although DHCP server 200 is illustrated as within the virtual layer in FIG. 1A, it is important to note that the logical DHCP server instances hosted within DHCP server 200 are logical layer abstractions.

In some embodiments, one or more VMs requesting DHCP services could represent malicious clients that may generate multiple DHCP requests with synthetic MAC addresses, thereby exhausting all of the static bindings or IP addresses of a logical DHCP server instance. Thus, VMs executing on real hosts (e.g. hosts 140-160) may be unable to procure DHCP services. To combat this, control cluster 120 may push to DHCP server 200, the MAC address table of each logical switch associated with a logical DHCP server instance created by the management cluster 110. Whenever a DHCP request is received by DHCP server 200, DHCP server 200 may validate the MAC address of the VM the request was received from against the MAC addresses in the table associated with the logical switch the requesting VM originated from. If the MAC address is not in the table, DHCP server 200 may drop the request and notify a user. In addition, whenever DHCP server 200 leases a static binding or dynamic IP address, it may transmit an indication of the MAC/IP address lease to the control cluster 120, which may push the indication to the host of the VM. The host may then update its port security rules accordingly.

Figure 3:
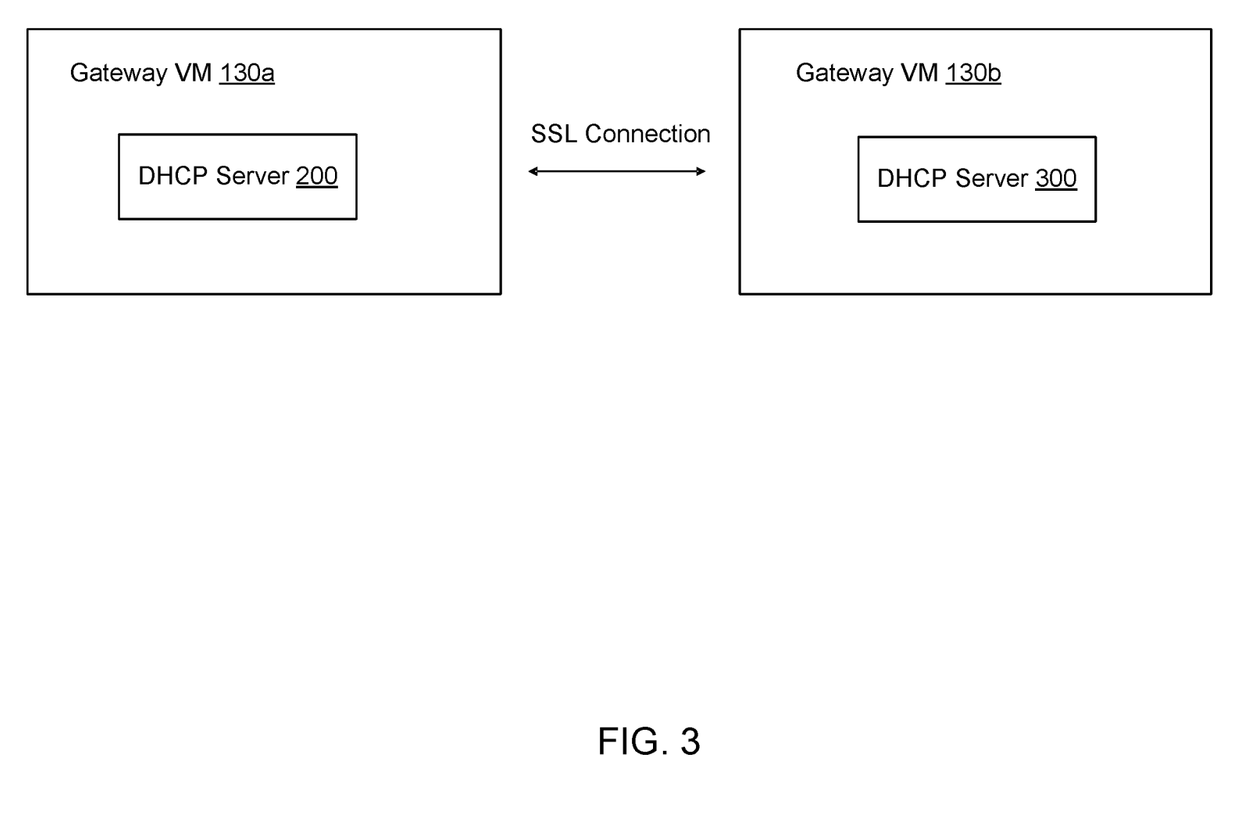
FIG. 3 is a block diagram of two DHCP servers during an exemplary lease information synchronization process in accordance with some embodiments of the present disclosure.

FIG. 3 illustrates the DHCP servers 200 and 300 executing on gateway VM 130*a* and gateway VM 130*b* respectively. DHCP server 200 may periodically synchronize the IP address lease information for each of the logical DHCP server instances it is hosting to the database of a DHCP server executing on one or more of the plurality of gateway VMs 130*b*-130*n*. The DHCP server a logical DHCP server instance's lease information will be synchronized to may depend on the active and standby states of the logical DHCP server instance and the plurality of DHCP servers. FIG. 3 illustrates synchronization between DHCP server 200 and DHCP server 300 for simplicity only. Management plane 110 (shown in FIG. 1) may push a thumbprint of each gateway VM in the plurality of gateway VMs to gateway VM 130*a* during creation of the plurality of gateway VMs. When performing a synchronization operation, DHCP server 200 may initiate a secure socket layer (SSL) connection between itself and DHCP server 300. Upon initiating the SSL connection with DHCP server 300, DHCP server 200 may receive the thumbprint of gateway VM 130b and verify the received thumbprint with the gateway VM 130b thumbprint received from management plane 110. Upon verification, DHCP server 200 may complete the SSL connection. If, however, the thumbprints do not match, DHCP server 200 may terminate the connection.

DHCP server 200 may then perform synchronization. DHCP server 200 may create a timestamp corresponding to the time at which the SSL connection with DHCP server 300 is established. In addition, DHCP server 200 may retrieve a timestamp corresponding to the last synchronization of lease information from database 220. DHCP server 200 may replicate every IP address lease provided between the timestamp of the last synchronization and the timestamp of the SSL connection to the DHCP server 300 running on gateway VM 130b. During this first replication, DHCP server 200 may continue servicing lease requests. Gateway VM 130a may enter the inactive state, and gateway VM 130b may enter the active state so that DHCP server 300 may begin servicing DHCP requests. DHCP server 300 may synchronize all IP address lease information generated between the time stamp of the SSL connection and the present time to DHCP server 200 and may create a second timestamp corresponding to the time the second synchronization was performed. This second timestamp is then transmitted to DHCP server 200. Gateway VM 130a may then reenter the active state so that DHCP server 200 may resume servicing DHCP service requests as well as write the second timestamp to the database 220. When the next synchronization operation is to be performed, the second timestamp may correspond to the time of the previous synchronization. In this manner, the amount of time gateway VM 130a must be deactivated for a full synchronization is minimal. In some embodiments, use of the SSL connection may allow for encryption of the lease data using a secure certificate.

Each DHCP server in the plurality of DHCP servers may periodically synchronize IP address lease information with one or more other DHCP servers in the plurality. In some embodiments, each logical DHCP server instance hosted on a DHCP server may have a different standby host, in which case the IP address leases for each logical DHCP server instance must be synched to a different DHCP server. The process is the same as described above, and DHCP server 200 for example, may sync the IP address lease information from each logical DHCP server instance it is hosting with an appropriate DHCP server executing on any of the gateway VMs 130a-130n. It follows that in this scenario, if gateway VM 130a fails, then each of the logical DHCP server instances it hosts will be taken over by the gateway VM that logical DHCP server instance was synchronized to. Each gateway VM that takes over a logical DHCP server instance in this way may send out indicators of the new location where the logical DHCP server instance will be realized.

In some embodiments, one or more gateway VMs of the plurality of gateway VMs 130a-130n executing DHCP servers may lose their connection with each other, resulting in an inability of the DHCP servers executing on those gateway VMs to synchronize IP address lease information with each other. In this situation, each DHCP server may begin allocating IP addresses randomly to avoid IP address collision to the extent possible. Once a point is reached where there are no unassigned IP addresses, each DHCP server may sort expired IP address assignments based on their expiration time and a form a new IP pool with those expired IP addresses. Each DHCP server may begin allocating IP addresses from its newly created pool based on the length of time each IP address in the pool has been expired.

During operation, as discussed below in more detail with respect to FIGS. 4-6, management cluster 110 may define a plurality of gateway virtual machines (VMs) 130a-130n, wherein each of the gateway VMs 130a-130n are configured to execute a separate DHCP server that runs a single DHCP process, thereby creating a plurality of DHCP servers. Management cluster 110 may create a profile that indicates a first gateway VM 130a and a second gateway VM 130b from the plurality of gateway VMs, on which a DHCP server 200 and a second DHCP server 300 will be executed respectively. For each of the hosts 140-160, management cluster 110 may define a respective logical DHCP server instance within each of DHCP server 200 and DHCP server 300 based, at least in part, on the created profile, wherein each of the logical DHCP server instances includes one or more static bindings or internet protocol (IP) addresses for assignment to one or more VMs of the host. Management cluster 110 may define a logical forwarding element (LFE) 140a configured to route one or more packets between a host 140 and its corresponding logical DHCP server instance. Management cluster 110 may define an LFE port 150a that is configured to connect the LFE 140a to DHCP server 200. DHCP server 200 identifies a host that a packet originates from based on a LFE port identification (ID) of the packet. DHCP server 200 may lease static bindings or dynamic IP addresses to VMs that request DHCP services and may periodically synchronize lease information corresponding to dynamic IP address leases with at least one other DHCP server from the plurality of DHCP servers.

Figure 4:
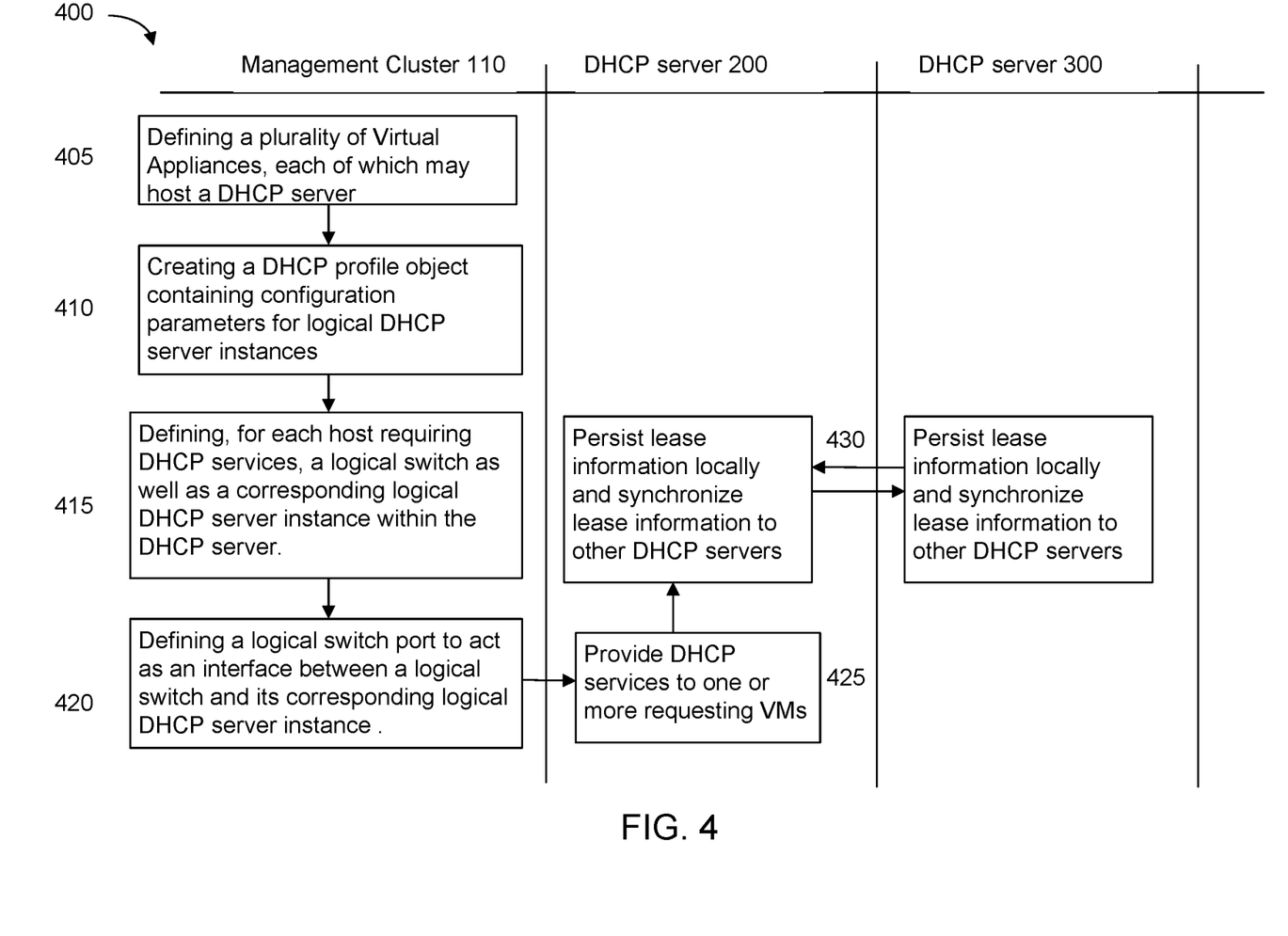
FIG. 4 is a swim lane diagram of an exemplary method in accordance with some embodiments of the present disclosure.

FIG. 4 illustrates a flow diagram of a method 400, in accordance with embodiments of the present disclosure. Method 400 may be performed by the architecture 100, of FIG. 1, for example. At 405, management cluster 110 may initialize a plurality of virtual appliances 130a-130n (shown in FIGS. 1A and 1B) in the data plane, wherein each virtual appliance may provide the underlying system upon which a physical DHCP server may run and host one or more logical DHCP server instances. Any suitable virtual appliance capable of facilitating physical DHCP services as described herein may be used such as a gateway VM. In the example of FIG. 4, the virtual appliances 130a-130n are gateway VMs. Management cluster 110 (shown in FIGS. 1A and 1B) may select gateway VMs 130a and 130b to act as a DHCP server pair. More specifically, at 410, management plane 110 may create a DHCP profile object (not shown) having configuration parameters indicating gateway VMs 130a and 130b as the location where logical DHCP services will be realized. Thus, a logical DHCP server instance created with this DHCP profile may service DHCP requests from VMs on logical switches that are connected to the gateway VMs 130a and 130b (as specified in the profile object). The DHCP profile object may also include configuration parameters for defining a logical DHCP server instance such as the unique universal identifier (UUID) of the gateway VMs 130a and 130b, as well as static bindings and/or IP pools, lease duration, warning threshold, error threshold, and classless static route option, among others. Management cluster 110 may assign a UUID to the profile object in order to easily reference it when creating logical DHCP server instances, for example. Management cluster 110 may designate gateway VM 130a as an active VM, and designate gateway VM 130b as a standby VM with which to carry out failover processes (as discussed in more detail below) in case of a failure of gateway VM 130a. The DHCP profile object may be reused by the management cluster 110 to create multiple logical DHCP server instances. The management cluster 110 may add the UUID of the DHCP profile object into its own configuration profile, in order to streamline the creation of future logical DHCP server instances.

As discussed above, each of the plurality of gateway VMs 130a-130n may be configured to execute a DHCP server, such as DHCP server 200 (shown in FIGS. 1A and 1B) executing on gateway VM 130a. As described in more detail herein, a DHCP server executing on a gateway VM may host one or more logical DHCP server instances using a single DHCP server process.

At 415, when VMs of a host, such as host 140, require DHCP services, management cluster 110 may provision a logical switch, such as logical switch 140a configured to facilitate requests for DHCP services from VMs of the host 140, for example. Logical DHCP server instances may have a 1:1 relationship with logical switches. Alternatively, management cluster 110 may utilize an already existing logical switch, such as logical switch 150a, for example to facilitate requests for DHCP services from VMs of the host 140. Thus, in some embodiments, if multiple hosts are required to get IP addresses from the same logical DHCP server instance, then they can be connected to the same logical switch. Logical switch 140a may be implemented across several managed switching elements (not shown). Logical switch 140a may route network traffic between various VMs running on host 140. Stated differently, logical switch 140a may make switching decisions to route network data at the data link layer between the one or more VMs running on host 140 based on one or more forwarding tables (not shown) that the logical switch 140a has. It should be noted that the use of a logical switch, such as switch 140a, is by example only, and any appropriate logical forwarding element (LFE) may be used. In addition, for each logical switch, management cluster 110 may provision a logical DHCP server instance (not shown) within the DHCP servers 200 and 300 executing on gateway VM 130a and 130b respectively by referencing the UUID of the previously created DHCP profile object to establish the configuration parameters of the logical DHCP server instance. For example, if hosts 140 and 150 both require DHCP services, then management cluster 110 may reference the DHCP profile object to provision different logical DHCP server instances for each, and replicate each host's respective logical DHCP server instance to the DHCP servers 200 and 300. As discussed above, the DHCP profile object may specify gateway VMs 130a and 130b as the active and standby gateways respectively where the logical DHCP server instances will be hosted, the static bindings and/or IP pools, lease duration, warning threshold, error threshold, classless static route option, and other options.

At 420, management cluster 110 may create a logical switch port on each logical switch, that may act as an interface between that logical switch and its corresponding logical DHCP server instance within DHCP server 200. For example, management cluster 110 may create logical switch port 140b (shown in FIGS. 1A and 1B) on the logical switch 140a, which may act as an interface between logical switch 140a and its corresponding logical DHCP server instance. Because the logical switch 140a is to be connected to a logical DHCP server instance, management cluster 110 may configure the logical switch port 140b as a DHCP type port, and assign the logical DHCP server instance UUID to the logical switch port 140b, thereby associating the logical switch 140a to its corresponding logical DHCP server instance. At 425, in response to receiving a request for DHCP services from a VM of the host 140, the DHCP server 200 may lease a static binding or dynamically lease an IP address from the logical DHCP server instance associated with the logical switch that the host 140 is connected to.

Each request packet received by DHCP server 200 may carry the logical switch port ID of the logical switch the packet originated from (in the present example, the logical switch port ID of logical switch port 140b). Thus, the DHCP server 200 may determine the host a packet originates from (as well as the corresponding logical DHCP server instance) based on the logical switch port ID carried by the packet.

As discussed above, the management cluster 110 (shown in FIG. 1) of the network may define one or more logical DHCP server instances and their associated logical switch ports as well as the configuration parameters that each logical DHCP server instance is to be provisioned with. The management cluster 110 may transmit this information to the control cluster 120, which may write the configuration parameters for each logical DHCP server instance as well as the mappings between each logical DHCP server instance and its associated logical switch port directly to an associated configuration table within the database 220 of the DHCP server 200. DHCP server process 210 may monitor the configuration tables and copy the information contained in them, as well as any changes to the tables into its own internal data structure. Each configuration table may include a lease entry indicating lease information for that logical DHCP server instance. Lease information may include information such as the static bindings and/or dynamic IP address assignments that the logical DHCP server instance has leased out. Thus, logical DHCP server 200 may host multiple logical DHCP server instances, as they are created for each host.

As discussed further below, each configuration table may also include entries containing information about the configuration parameters and the logical switch port ID of its associated logical DHCP server instance. In addition, each configuration table may also contain a separate resource entry, which contains the status of the logical DHCP server instance's resources (e.g., threshold, error as discussed above with respect to FIG. 2). Further, each configuration table may contain one or more entries indicating whether the associated logical DHCP server instance is active mode or in standby mode as well as whether it is ready or not ready to provide DHCP services.

At 430, DHCP server 200 may persist the lease information locally as well as synchronize the lease information corresponding to dynamic IP address leases ("IP address lease information") with one or more DHCP servers executing on one or more of the plurality of gateway VMs 130a-130n as described in more detail herein. For example, DHCP server 200 may synchronize lease information with DHCP server 300 executing on gateway VM 130b.

Figure 5:
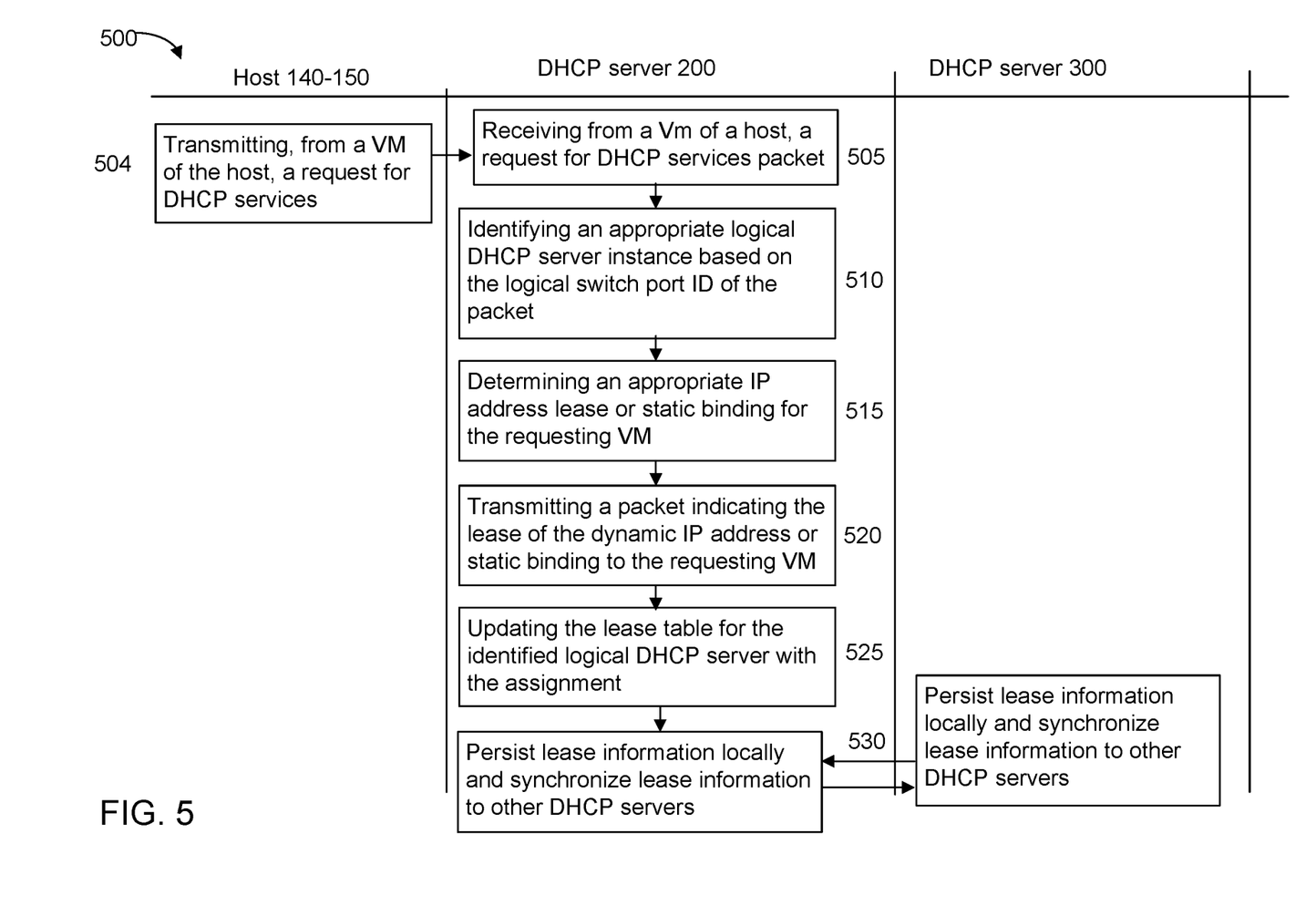
FIG. 5 is a swim lane diagram of an exemplary method in accordance with some embodiments of the present disclosure.

FIG. 5 illustrates a swim lane diagram of a method 500, in accordance with embodiments of the present disclosure. Method 500 may be performed by a DHCP server, such as DHCP server 200 of FIG. 2.

At 504, a VM of host 140 may transmit a request for DHCP services to the DHCP server 200 (shown in FIG. 2). At 505, DHCP server 200 may receive the request for DHCP services. More specifically, datapath 230 (shown in FIG. 2) may include a data plane development kit (DPDK)-based framework which bypasses the kernel networking stack for packet fast forwarding/receiving. Datapath 230 may receive a DHCP request packet from a VM. Such DHCP request packets may include the logical switch port ID of the logical switch port associated with the host the requesting VM is running on. Datapath 230 may forward received DHCP request packets and their logical switch port ID to DHCP server process 210 (shown in FIG. 2), which, at 510, may identify the logical DHCP server instance associated with the logical switch port ID and service the request accordingly. At 515, the DHCP server process 210 may query database 220 for the configuration information and lease information of the identified logical DHCP server instance and determine an appropriate static binding or dynamic IP address to assign to the requesting VM. At 520, DHCP server process 210 may generate a packet including the lease and send the packet with the appropriate logical switch port ID to the datapath 230 for routing to the appropriate logical switch port, which may route the packet back to the requesting VM. At 525, DHCP server process 210 may update the lease entry in the configuration table associated with the logical DHCP server instance with the assignment. In some embodiments, if a relay is used, DHCP server process 210 may write the IP address leased, as well as the logical switch port ID, the subnet, and the media access control (MAC) address of the VM the lease was provided to in the lease entry of the corresponding logical DHCP server instance's configuration table within database 220 (shown in FIG. 2). In some embodiments, if a relay is not used, the DHCP server process 210 may write the IP address leased, as well as the logical switch port ID and the subnet of the VM the lease was provided to, as well as an all zero MAC address in the lease entry of the corresponding logical DHCP server instance's configuration table within database 220.

In some embodiments, DHCP server process 210 may attempt to maintain IP address leases for as long as possible to a requesting VM by associating the IP address with the requesting VM's MAC address. After expiration of the lease, DHCP server process 210 may refrain from leasing that IP address out to VMs having a different MAC address than the one associated to the IP address until, for example, there are no other remaining IP addresses to lease out. If the VM with the associated MAC address subsequently requests DHCP services, DHCP server process 210 may look up the IP address associated with the VM's MAC address and assign the IP address to the requesting VM if it is still available.

In some embodiments, a VM in need of DHCP services may send a request for such services as a broadcast packet to each logical switch. In other embodiments, if a DHCP server is providing DHCP services to multiple hosts via a logical router, a VM in need of DHCP services may send a request for such services via the logical router, which may send the request as a unicast packet to each logical switch. In these embodiments, a DHCP server may identify the host a packet originates from based on its logical router ID.

The resource monitor 250 (shown in FIG. 2) may monitor the lease entry of the configuration table for each logical DHCP server instance and issue a warning indicator when the resources of a particular logical DHCP server instance reach a predefined usage threshold. For instance, upon determining that a particular logical DHCP server instance has only three IP addresses left, resource monitor 250 may transmit an indicator to the database 220, thereby setting a "threshold reached" status in the configuration table for that logical DHCP server instance in database 220. In addition, upon determining that a particular logical DHCP server instance has no IP addresses left for leasing, resource monitor 250 may transmit an error indicator to the database 220, thereby setting an "error" status in a resource entry of the configuration table for that logical DHCP server instance in database 220. If DHCP server 200 detects an error indicator in the resource entry of a logical DHCP server instance, then it will no longer serve requests for services from the logical DHCP server instance until the error indicator is removed.

At 530, as described in more detail herein, lease sync 240 may synchronize IP address lease information for each logical DHCP server instance being hosted by the DHCP server 200, to one or more other DHCP servers executing on other gateway VMs (such as DHCP server 300 executing on gateway VM 130b). Because each logical DHCP server instance hosted by DHCP server 200 may have different standby hosts and/or different active and standby periods, the IP address lease information for each may be synchronized to DHCP servers on different gateway VMs. In addition, lease synchronization 240 may receive IP address lease information from DHCP servers executing on other gateway VMs from the plurality of gateway VMs 130a-130n. The IP address lease information received may correspond to the lease information of one or more logical DHCP server instances being hosted on one or more gateway VMs 130a-130n. Lease synchronization 240 may write the IP address lease information received from other DHCP servers into respective configuration tables in database 220 meant for backing up the lease information from other DHCP servers.

Figure 6:
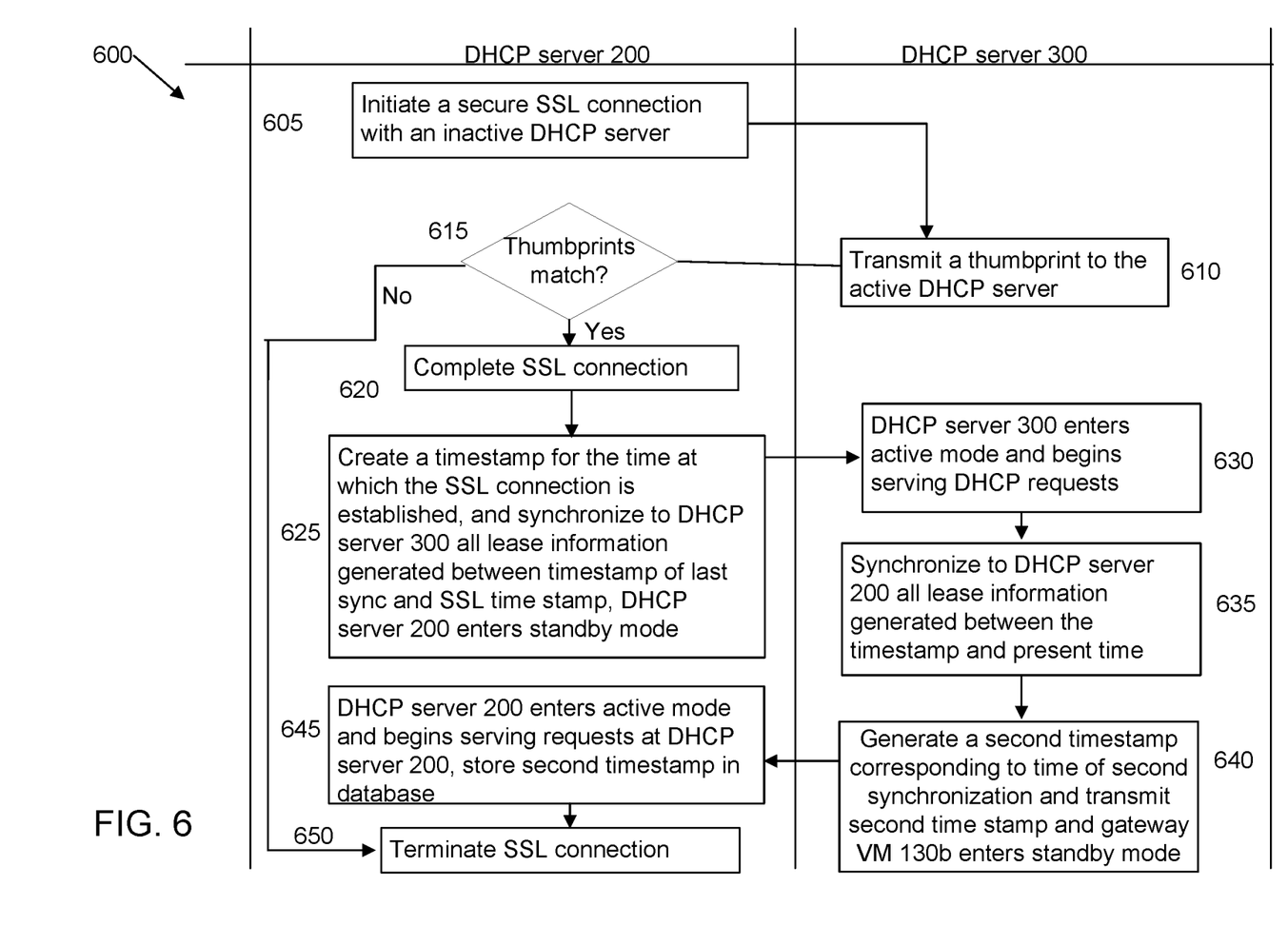
FIG. 6 is a swim lane diagram of an exemplary method in accordance with some embodiments of the present disclosure.

FIG. 6 illustrates a swim lane diagram of a method 600 in accordance with embodiments of the present disclosure. Although shown as being performed between DHCP servers 200 and 300 for simplicity, method 600 may be performed between one or more of the plurality of DHCP servers illustrated in FIG. 1. Management plane 110 (shown in FIG. 1) may push a thumbprint of each gateway VM in the plurality of gateway VMs to DHCP server 200 during creation of the plurality of gateway VMs. At 605, DHCP server 200 may initiate a secure socket layer (SSL) connection between itself and DHCP server 300. At 610, upon initiating the SSL connection, DHCP server 300, may transmit the thumbprint of gateway VM 130b to DHCP server 200. At 615, DHCP server 200 may verify the received thumbprint with the gateway VM 130b thumbprint received from management plane 110. Upon verification, at 620 DHCP server 200 may complete the SSL connection. If, however, the thumbprints do not match, DHCP server 200 may terminate the connection.

At 625, DHCP server 200 may create a timestamp corresponding to the time at which the SSL connection with DHCP server 300 is established. In addition, DHCP server 200 may retrieve a timestamp (e.g., from database 220 shown in FIG. 2) corresponding to the last synchronization of lease information. DHCP server 200 may replicate every IP address lease provided between the timestamp of the last synchronization and the timestamp of the SSL connection to the DHCP server 300. During this first replication, DHCP server 200 may continue servicing DHCP requests. Upon completion of the replication, gateway VM 130a may enter the standby state and, at 630, gateway VM 130b may enter the active state so that DHCP server 300 may begin servicing DHCP requests. At 635, DHCP server 300 may synchronize all IP address lease information generated between the timestamp of the SSL connection and the present time to DHCP server 200. At 640, DHCP server 300 may create a second timestamp corresponding to the time the second synchronization was performed. DHCP server 300 may transmit the second timestamp to DHCP server 200 and then gateway VM 130b may enter standby mode. At 645, gateway VM 130a may reenter the active state so that DHCP server 200 may resume servicing DHCP service requests as well as write the second timestamp to the database 220. In this manner, the amount of time gateway VM 130a must be deactivated for a full synchronization is minimal. At 650, DHCP server 200 may terminate the SSL connection. In some embodiments, use of the SSL connection may allow for encryption of the lease data using a secure certificate.

Each DHCP server in the plurality of DHCP servers may periodically synchronize IP address lease information with one or more other DHCP servers in the plurality. In some embodiments, each logical DHCP server instance hosted on a DHCP server may have a different standby host, in which case the leases for each logical DHCP server instance must be synched to a different DHCP server. The process is the same as described above, and DHCP server 200 for example, may sync the lease information from each logical DHCP server instance it is hosting with an appropriate DHCP server executing on any of the gateway VMs 130a-130n. It follows that in this scenario, if gateway VM 130a fails, then each of the logical DHCP server instances it hosts will be taken over by the gateway VM that logical DHCP server instance was synchronized to. Each gateway VM that takes over a logical DHCP server instance in this way may send out indicators of the new location where the logical DHCP server instance will be realized.

In some embodiments, one or more gateway VMs of the plurality of gateway VMs 130a-130n executing DHCP servers may lose their connection with each other, resulting in an inability of the DHCP servers executing on those gateway VMs to synchronize IP address lease information with each other. In this situation, each DHCP server may begin allocating IP addresses randomly to avoid IP address collision to the extent possible. Once a point is reached where there are no unassigned IP addresses, each DHCP server may sort expired IP address assignments based on their expiration time and a form a new IP pool with those expired IP addresses. Each DHCP server may begin allocating IP addresses from its newly created pool based on the length of time each IP address in the pool has been expired.

Some embodiments include electronic components, such as microprocessors, storage and memory that store computer program instructions in a machine-readable or computer readable medium (alternatively referred to as computer-readable storage media, machine-readable media, or machine readable storage media). Some examples of such computer readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD 10 cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

While the invention has been described with reference to numerous specific details, one of ordinary skill in the art will recognize that the invention can be embodied in other specific forms without departing from the spirit of the invention. In addition, a number of the figures (including FIGS. 5, 6, and 7) conceptually illustrate methods. The specific operations of these methods may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for providing high availability dynamic host configuration protocol (DHCP) services for a plurality of logical networks, the method comprising:
deploying two edge forwarding nodes, wherein each edge forwarding node is configured to execute a DHCP server and to serve as a gateway for each of two logical networks, each logical network comprising a logical forwarding element (LFE);
for each particular logical network, assigning one DHCP server of one edge forwarding node as an active DHCP server for the particular logical network and another DHCP server of another edge forwarding node as a standby DHCP server for the particular logical network;
configuring each edge forwarding node to connect to a logical port of each LFE of each logical network in order to receive DHCP requests from machines connected to each logical network and to provide, through the edge forwarding node's DHCP server, network addresses to the machines in response to DHCP requests; and
configuring the two DHCP servers on the two edge forwarding nodes to synchronize assigned network addresses.

2. The method of claim 1 further comprising:
defining a logical DHCP server instance within each of the two DHCP servers, wherein the logical DHCP server instance is associated with a particular LFE to which each edge forwarding node connects; and
storing, in a database of a first of the two DHCP servers and a database of a second of the two DHCP servers, a mapping between the logical DHCP server instance and its associated LFE as well as a set of network addresses to be assigned by the logical DHCP server instance.

3. The method of claim 2, further comprising:
in response to receiving, from a machine connected to a logical network to which the the particular LFE belongs, a DHCP request packet indicating a request for DHCP services at the first DHCP server, looking up the set of network addresses to be assigned by the logical DHCP server instance;
determining a network address to assign to the requesting machine;
transmitting the assigned network address to the requesting machine; and
updating the database of the first DHCP server to reflect the assigned network address.

4. The method of claim 3, wherein synchronizing assigned network addresses comprises:
performing a first synchronization between the first DHCP server and at least the second DHCP server while the first DHCP server is actively serving DHCP requests;

halting the first DHCP server's service of DHCP requests; and performing a second synchronization between the first DHCP server and at least the second DHCP server.

5. The method of claim 4, further comprising:
detecting that the edge forwarding node that executes the first DHCP server has suffered a termination of service; and in response to the detection:
using the edge forwarding node that executes the second DHCP server to provide DHCP services to at least one logical network; and
transmitting one or more indications identifying the second DHCP server as the active DHCP server for the at least one logical network.

6. The method of claim 4 further comprising verifying the second DHCP server.

7. The method of claim 1, further comprising monitoring a set of unassigned network addresses and transmitting a warning when a number of unassigned network addresses falls below a threshold.

8. A non-transitory computer readable storage medium storing a program that, when executed by at least one processing unit, configures a physical machine to provide high availability dynamic host configuration protocol (DHCP) services for a plurality of logical networks, the program comprising sets of instructions for:
deploying two edge forwarding nodes, wherein each edge forwarding node is configured to execute a DHCP server and to serve as a gateway for each of two logical networks, each logical network comprising a logical forwarding element (LFE);
for each particular logical network, assigning DHCP server of one edge forwarding node as an active DHCP server for the particular logical network and another DHCP server of another edge forwarding node as a standby DHCP server for the particular logical network;
configuring each edge forwarding node to connect to a logical port of each LFE of each logical network in order to receive DHCP requests from machines connected to each logical network and to provide, through the edge forwarding node's DHCP server, network addresses to the machines in response to DHCP requests; and
configuring the two DHCP servers on the two edge forwarding nodes to synchronize assigned network addresses.

9. The non-transitory computer readable medium of claim 8, wherein the program further comprises sets of instructions for:
defining a logical DHCP server instance within each of the two DHCP servers, wherein the logical DHCP server instance is associated with a particular LFE to which each edge forwarding node connects; and
storing, in a database of a first of the two DHCP servers and a database of a second of the two DHCP servers, a mapping between the logical DHCP server instance and its associated LFE as well as a set of network addresses to be assigned by the logical DHCP server instance.

10. The non-transitory computer readable medium of claim 9, wherein program further comprises sets of instructions for:
in response to receiving, from a machine connected to the particular LFE, a DHCP request packet indicating a request for DHCP services at the first DHCP server executing on one of the edge forwarding nodes, looking up the set of network addresses to be assigned by the logical DHCP server instance;
determining a network address to assign to the requesting machine;
transmitting the assigned network address to the requesting machine; and
updating the database of the first DHCP server to reflect the assigned network address.

11. The non-transitory computer readable medium of claim 10, wherein synchronizing assigned network addresses comprises:
performing a first synchronization between the first DHCP server and at least the second DHCP server while the first DHCP server is actively serving DHCP requests;
halting the first DHCP server's service of DHCP requests; and
performing a second synchronization between the first DHCP server and at least the second DHCP server.

12. The non-transitory computer readable medium of claim 11, wherein the program further comprises sets of instructions for:
detecting that the edge forwarding node that executes the first DHCP server has suffered a termination of service; and in response to the detection:
using the edge forwarding node that executes the second DHCP server to provide DHCP services to at least one logical network; and
transmitting one or more indications identifying the second DHCP server as the active DHCP server for the at least one logical network.

13. The non-transitory computer readable medium of claim 8, wherein the program further comprises a set of instructions for monitoring a set of unassigned network addresses and transmitting a warning when a number of unassigned network addresses falls below a threshold.

14. A system for providing high availability dynamic host configuration protocol (DHCP) services for a plurality of logical networks, the system comprising:
a management cluster configured to:
deploy two edge forwarding nodes, wherein each edge forwarding node is configured to execute a DHCP server and to serve as a gateway for each of two logical networks, each logical network comprising a logical forwarding element (LFE);
for each particular logical network, assign one DHCP server of one edge forwarding node as an active DHCP server for the particular logical network and another DHCP server of another edge forwarding node as a standby DHCP server for the particular logical network;
configure each edge forwarding node to connect to a logical port of each LFE of each logical network in order to receive DHCP requests from machines connected to each logical network and to provide, through the edge forwarding node's DHCP server, network addresses to the machines in response to DHCP requests; and
configure the two DHCP servers on the two edge forwarding nodes to synchronize assigned network addresses.

15. The system of claim 14, wherein the management cluster is further configured to:
define a logical DHCP server instance within each of the two DHCP servers, wherein the logical DHCP server instance is associated with a particular LFE to which each edge forwarding node connects; and store, in a database of a first of the two DHCP servers and a database of a second of the two DHCP servers, a mapping between the logical DHCP server instance and its associated LFE as well as a set of network addresses to be assigned by the logical DHCP server instance.

16. The system of claim 15, wherein the management cluster further configures the first DHCP server to:

in response to receiving, from a machine connected to the particular LFE, a DHCP request packet indicating a request for DHCP services, look up the set of network addresses to be assigned by the logical DHCP server instance;

determine a network address to assign to the requesting machine;

transmit the network address assign to the requesting machine; and update the database of the first DHCP server to reflect the assigned network address.

17. The system of claim 16, wherein configuring the two DHCP servers on the two edge forwarding nodes to synchronize assigned network addresses comprises configuring the two DHCP servers to:

perform a first synchronization between the first DHCP server and at least the second DHCP server while the first DHCP server is actively serving DHCP requests;

halt the first DHCP server's service of DHCP requests; and perform a second synchronization between the first and at least the second DHCP server.

18. The system of claim 17, wherein the management cluster is further configured to:

detect that the edge forwarding node that executes the first DHCP server has suffered a termination of service; and in response to the detection:

use the edge forwarding node that executes the second DHCP server to provide DHCP services to the at least one logical network; and transmit one or more indications identifying the second DHCP server as the active DHCP server for the at least one logical network.

19. The system of claim 14, wherein the management cluster further configures the first DHCP server to monitor a set of unassigned network addresses and transmitting a warning when a number of unassigned network addresses falls below a threshold.

20. The method of claim 2, wherein the logical DHCP server instance is one of a plurality of logical DHCP server instances defined within each of the first and second DHCP servers, each logical DHCP server instance in the plurality of logical DHCP server instances is configured as one of an active logical DHCP server instance and a standby logical DHCP server instance, and the first and second DHCP servers synchronize assigned network addresses for active logical DHCP server instances and for standby logical DHCP server instances on each of the first and second DHCP servers.

21. The method of claim 20, wherein each logical DHCP server instance in the plurality of DHCP server instances is further configured to alternate between an active state and a standby state based on specified active and standby periods.

22. The method of claim 21, wherein (i) a first DHCP server instance executed by the first DHCP server is the active DHCP server instance for the first logical network and a second DHCP server instance executed by the first DHCP server is the standby DHCP server instance for the second logical network, and (ii) a third DHCP server instance executed by the second DHCP server is the standby DHCP server instance for the first logical network and a fourth DHCP server instance executed by the second DHCP server is the active DHCP server instance for the second logical network.

23. The method of claim 21, wherein (i) a first DHCP server instance executed by the first DHCP server is the active DHCP server instance for the first logical network and a second DHCP server instance executed by the first DHCP server is the active DHCP server instance for the second logical network, and (ii) a third DHCP server instance executed by the second DHCP server is the standby DHCP server instance for the first logical network and a fourth DHCP server instance executed by the second DHCP server is the standby DHCP server instance for the second logical network.

24. The method of claim 1, wherein the LFE comprises a logical switch.

* * * * *